(12) United States Patent
Bright

(10) Patent No.: US 9,356,502 B2
(45) Date of Patent: May 31, 2016

(54) MAGNETIC GEAR ARRANGEMENT HAVING A VARIABLE GEAR RATIO

(71) Applicant: ROLLS-ROYCE PLC, London (GB)

(72) Inventor: Christopher G. Bright, Nottingham (GB)

(73) Assignee: ROLLS-ROYCE plc, London (GB)

( * ) Notice: Subject to any disclaimer, the term of this patent is extended or adjusted under 35 U.S.C. 154(b) by 305 days.

(21) Appl. No.: 14/251,008

(22) Filed: Apr. 11, 2014

(65) Prior Publication Data

US 2014/0217838 A1 Aug. 7, 2014

Related U.S. Application Data

(63) Continuation of application No. 13/060,844, filed as application No. PCT/EP2009/005384 on Jul. 24, 2009, now Pat. No. 8,810,098.

(30) Foreign Application Priority Data

Sep. 18, 2008 (GB) .................................. 0817046.6

(51) Int. Cl.
| | |
|---|---|
| *H02K 49/10* | (2006.01) |
| *H02K 19/10* | (2006.01) |
| *H02K 49/06* | (2006.01) |
| *H02K 51/00* | (2006.01) |
| *H02K 19/02* | (2006.01) |
| *H02K 7/116* | (2006.01) |
| *H02K 16/02* | (2006.01) |

(52) U.S. Cl.
CPC .............. *H02K 49/102* (2013.01); *H02K 19/02* (2013.01); *H02K 19/106* (2013.01); *H02K 49/065* (2013.01); *H02K 51/00* (2013.01)

(58) Field of Classification Search
CPC ......... H02K 7/09; H02K 7/116; H02K 16/02; H02K 49/10
USPC .................. 310/103, 104, 105, 106, 112, 114
See application file for complete search history.

(56) References Cited

U.S. PATENT DOCUMENTS

| | | | |
|---|---|---|---|
| 3,382,386 | A | 5/1968 | Schlaeppi |
| 4,025,840 | A | 5/1977 | Brissey et al. |

(Continued)

FOREIGN PATENT DOCUMENTS

| | | |
|---|---|---|
| WO | WO 2007/107691 A1 | 9/2007 |
| WO | WO 2007/135360 A1 | 11/2007 |

OTHER PUBLICATIONS

Chau et al., "Transient analysis of coaxial magnetic gears using finite element comodeling," Journal of Applied Physics, 2008, vol. 103, No. 7, pp. 07F101-1-07F101-3.
Atallah et al., "A New PM Machine Topology for Low-Speed, High-Torque Drives," Proceedings of the 2008 International Conference on Electrical Machines, 2008, pp. 1-4.
Atallah et al., "A high-performance linear magnetic gear," Journal of Applied Physics, 2005, vol. 97, No. 10, pp. 10N516-1-10N516-3.

(Continued)

*Primary Examiner* — Michael Andrews
(74) *Attorney, Agent, or Firm* — Oliff PLC

(57) ABSTRACT

A magnetic gear arrangement is provided having a magnetically active gear member that generates a first magnetic field, which is modulated by interpoles. The modulated magnetic field generates magnetic poles on a magnetically passive gear member, and these poles form a second magnetic field. The material of the passive gear member is sufficiently magnetically hard that the first and second magnetic fields interact to couple the motion of the active and passive gear members according to a given gear ratio.

15 Claims, 4 Drawing Sheets

(56) References Cited

U.S. PATENT DOCUMENTS

| | | | | |
|---|---|---|---|---|
| 5,079,458 | A | * | 1/1992 | Schuster ............. H02K 49/102 310/90.5 |
| 6,566,778 | B1 | * | 5/2003 | Hasegawa ............. H02K 1/165 310/211 |
| 2008/0030091 | A1 | | 2/2008 | Unseld et al. |
| 2008/0136189 | A1 | * | 6/2008 | Qu ........................ H02K 49/02 310/103 |
| 2008/0272205 | A1 | | 11/2008 | Jorgensen et al. |
| 2008/0296997 | A1 | * | 12/2008 | Bando ................. H02K 21/029 310/261.1 |

OTHER PUBLICATIONS

Atallah et al., "Design, analysis and realization of a high-performance magnetic gear," IEE Proc.-Electr. Power Appl., 2004, vol. 151, No. 2, pp. 135-143.

International Search Report in International Application No. PCT/EP2009/005384; dated Mar. 11, 2010.

Written Opinion of the International Searching Authority in International Application No. PCT/EP2009/005384; dated Mar. 11, 2010.

British Search Report in British Application No. GB0817046.6 dated Jan. 29, 2009.

* cited by examiner

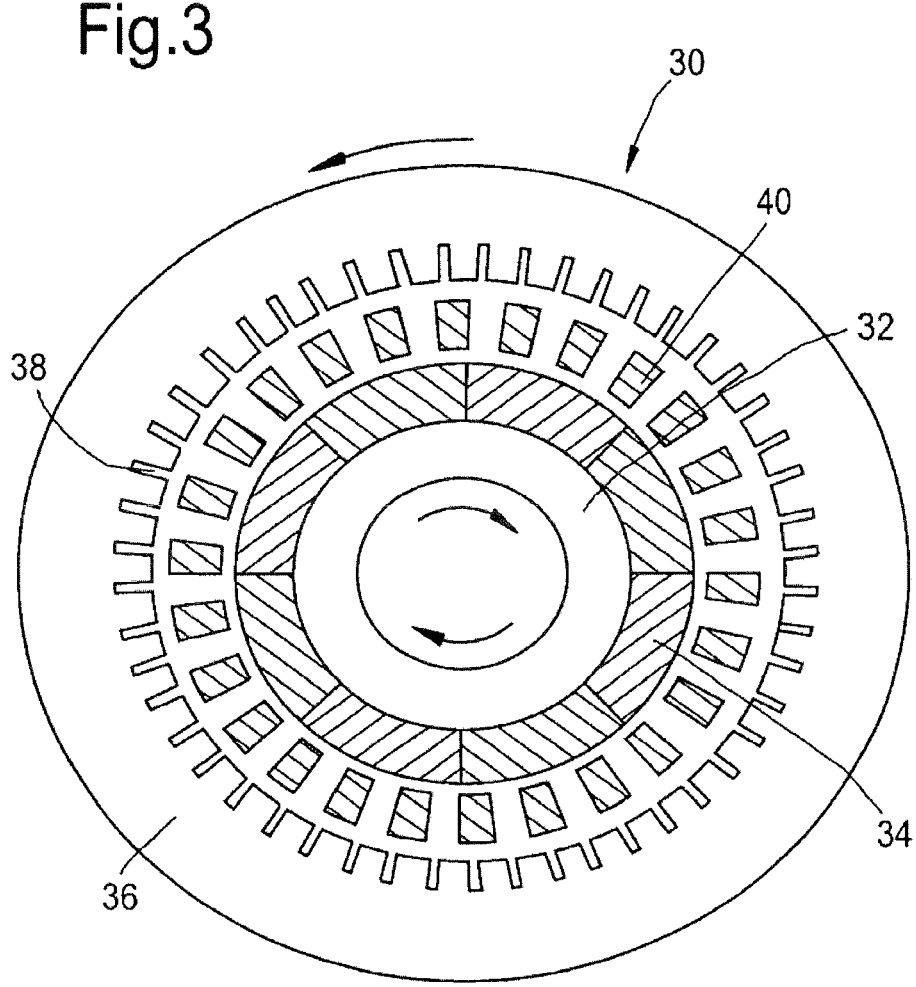

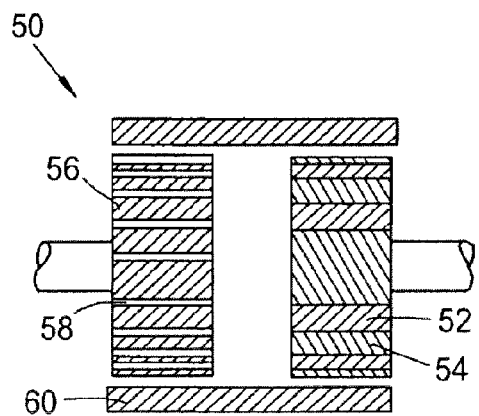
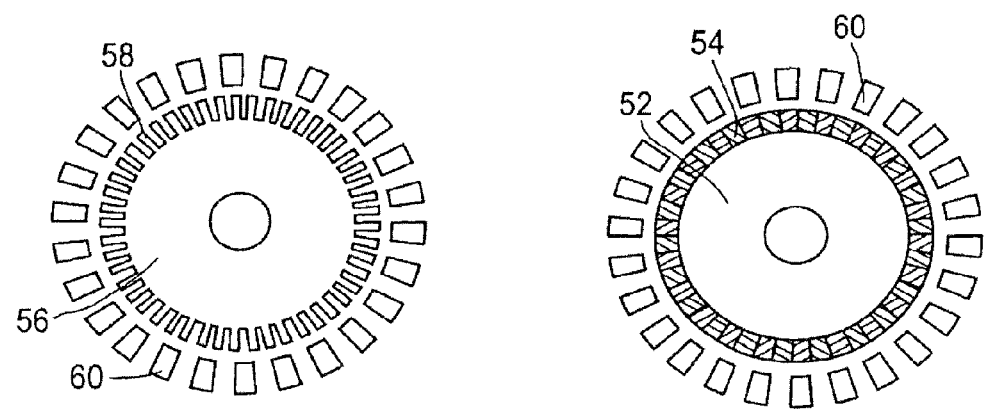

MAGNETIC GEAR ARRANGEMENT HAVING A VARIABLE GEAR RATIO

This is a continuation of U.S. application Ser. No. 13/060,844 filed Feb. 25, 2011, which is a National Phase Application of PCT/EP2009/005384 filed Jul. 24, 2009. This application also claims priority to GB 0817046.6 filed Sep. 18, 2008. The prior applications are hereby incorporated by reference herein in its entirety.

The present invention relates to magnetic gear arrangements, particularly magnetic gear arrangements having a variable gear ratio.

Gearboxes and gear arrangements are utilised in a wide range of situations in order to couple drive mechanisms. Traditionally, gearboxes have been formed from gear wheels having appropriate teeth numbers and sizes to provide a desired gear ratio. However, such gearboxes have a number of disadvantages. Firstly, they require the use of lubricating oils, which may act as contaminants or fire hazards and may prove ineffective in hot or cold environments, where the oil viscosity varies, or in a low pressure environment, where the oil may evaporate. Furthermore, gearboxes based on gear wheels may be noisy, making them unacceptable for low noise environments such as in hospitals, libraries and residential areas, or for use in clandestine military activity.

More recently, magnetic gearboxes have been provided which comprise respective gear rotors with interpoles between them. The rotors incorporate permanent magnets, and the interpoles, or pole members or elements, act to modulate the magnetic flux transferred between the gear rotors. Such magnetic gearboxes enable a speed-changing mechanical device to be provided in which there is no mechanical contact between input and output shafts, thus avoiding many of the problems of noise and wear that arise in gearboxes having contacting moving parts.

FIG. 1 shows a schematic plan view of a typical magnetic gear arrangement of the prior art. The magnetic gear arrangement 100 is an epicyclic gearbox and comprises an inner rotor 120 and an outer rotor 160. Permanent magnets 140,180 are fixed to the inner and outer rotors 120,160. The permanent magnets 140 affixed to the inner rotor 120 have alternating polarity along the circumference of the rotor. Similarly, the permanent magnets 180 affixed to the outer rotor 160 have alternating polarity along the circumference of that rotor. Typically, one rotor is mechanically coupled to a drive mechanism and the other rotor is mechanically coupled to a driven mechanism.

The inner and outer rotors 120,160 have different numbers of permanent magnets 140,180. Typically, the number of permanent magnets affixed to the outer rotor 160 is greater than that affixed to the inner rotor 120.

Interpoles 200 are provided between the inner rotor 120 and the outer rotor 160 and form an array having a cylindrical shape.

The interpoles 200 modulate the magnetic field produced by the inner rotor 120 and the magnetic field produced by the outer rotor 160, so as to couple the two fields and hence the motion of the rotors. The number of interpoles is a factor in determining the gear ratio of the magnetic gearbox.

The motion of the rotors 120,160 may be either co-rotational or counter-rotational, depending on the number of magnets affixed to each rotor and the number of interpoles.

The present invention provides a magnetic gear arrangement in which magnetic poles are formed within a magnetically passive gear member through the magnetic field generated by a magnetically active gear member.

In particular, a first aspect of the invention may provide a magnetic gear arrangement comprising:
a magnetically active gear member for generating a first magnetic field,
a magnetically passive gear member, and
interpoles between said magnetically active member and said magnetically passive gear member for modulating the first magnetic field;
wherein magnetic poles are generated within the magnetically passive gear member by the modulated first magnetic field, the generated poles forming a second magnetic field; and
wherein the magnetically passive gear member is formed of sufficiently magnetically hard material that the first magnetic field couples to the second magnetic field to produce a gear ratio between the magnetically active and the magnetically passive gear members.

The magnetic gear arrangement of the present invention includes a magnetically passive gear member that need not have permanent magnets affixed to it. Instead, magnetic poles are formed on this gear member through the action of a modulated magnetic field generated elsewhere within the arrangement. As a result, the number of magnetic poles on the gear member may be varied and the range of gear ratios attainable by the magnetic gear arrangement may be increased.

A further advantage of a magnetically passive gear member is that it may have a simple construction, since there is no requirement for permanent magnets. As a result, the magnetically passive gear member will tend to be cheaper than known magnetically active gear members and may exhibit better strength. Magnetically hard materials tend to have high tensile strength, which contributes further to the mechanical properties of the passive gear member. Typically, the magnetically active and magnetically passive gear members are rotors. Strength and stability of a rotor are particularly important at high rotational speeds and so in general, the magnetically passive gear member is configured to act as a high speed rotor relative to the magnetically active gear member.

The ability of the passive gear member to withstand high rotational speeds may make the magnetic gear arrangement of the first aspect of the invention particularly suitable for specialist applications such as gyroscopes.

The magnetically hard material is characterised by high levels of hysteresis and a high coercivity. In general, the coercivity is at least 10 000 Amperes per meter. Typically, the magnetically hard material is chrome steel or cobalt steel.

The modulated first magnetic field may generate two distributions of magnetic poles on the magnetically passive gear member. The number of poles in the high-pole number first distribution corresponds to the sum of the number of interpoles and the number of poles in the first magnetic field. The number of poles in the low-pole number second distribution corresponds to the difference between these two numbers.

It is generally preferable that the number of poles formed on the magnetically passive gear member should correspond to the low-pole second distribution of poles, since this allows the gear member to operate as a high speed gear member. Therefore slots may be provided on the magnetically passive gear member to disrupt the formation of a magnetic pole distribution corresponding to the high-pole first distribution.

In the case of a magnetically passive gear member that is a rotor, these slots will typically extend radially inwards from the outer surface of the rotor.

It is thought that the high-pole distribution tends to be restricted to the surface of the magnetically passive gear member, while the low-pole distribution tends to penetrate to the core of the member. Thus, by providing slots at the surface whose spacing is incompatible with the spacing of the high-pole distribution, it is possible to selectively inhibit the formation of this pole distribution and therefore to promote the formation of the low-pole distribution. The spacing of the slots may be regular or irregular. The slots may have identical dimensions or may have different dimensions.

The slots provided on the magnetically passive gear member may be filled with non-magnetic material rather than allowed to be open to the air. This may reduce windage losses, since it allows a smooth outer surface of the gear member to be provided.

Alternatively, the disrupting slots may contain an electrical winding for producing various electromagnetic effects such as improved starting, and damping of unwanted oscillations. This winding may be a cage winding such as that used in a squirrel cage induction motor, or an amortisseur winding used to damp transient behaviour in an electrical synchronous machine. Possibly the slots may further contain electrically insulating material so that the electrical winding may be electrically insulated from the magnetically passive gear member.

The magnetic gear arrangement of the present invention is typically configured so that the interpoles remain stationary when the gearbox is in operation. However, alternative configurations are possible, in which the interpoles move during use and one of the gear members (preferably the magnetically active gear member) remains stationary.

The magnetically active gear member may comprise permanent magnets.

The magnetically active gear member may be a stator and the magnetically passive gear member may be a rotor.

The magnetically active gear member may comprise electrical windings through which an electrical current may be passed to generate the first magnetic field.

The magnetic gear arrangement may form a hysteresis motor or a hysteresis generator.

The magnetically active and magnetically passive gear members may be elongate to form a linear actuator.

The magnetically active gear member may be tubular and the magnetically passive gear member may be arranged within the magnetically active gear member.

The magnetic gear arrangement of the present invention may be adapted to provide a hysteresis motor, by converting the magnetically active gear member into a stator having electrical windings that may generate a magnetic field.

Thus, a second aspect of the invention may provide a hysteresis motor comprising:

a stator having windings through which an electrical current may be passed to generate a first magnetic field;

a rotor; and interpoles between said stator and said rotor for modulating the first magnetic field;

wherein magnetic poles are generated within the rotor by the modulated first magnetic field, the generated poles forming a second magnetic field; and wherein the rotor is formed of sufficiently magnetically hard material that the first magnetic field couples to the second magnetic field to induce rotational motion of the rotor at a rotational speed that is dependent on the number and/or the spacing of said interpoles. The hysteresis motor of the second aspect of the invention may allow high rotor speeds to be generated from relatively low frequency electric current, e.g. 50 Hz, 60 Hz, or 400 Hz. Electric current of these frequencies is widely available and easy to generate. The interpoles effectively provide an in-built gearing mechanism, that is, they allow the relationship between the speed of the rotor and the frequency of the electric current to be varied e.g. by changing the number of interpoles and/or their spacing.

By applying an external mechanical drive to the hysteresis motor of the second aspect of the invention, the device may be used to generate electrical power. The external mechanical drive causes the magnetic axis of the rotor to lead that of the stator, so as to generate electrical power in the windings of the stator.

Thus, a third aspect of the invention may provide a hysteresis generator comprising:

a stator having windings through which an electrical current may be passed to generate a first magnetic field;

a rotor; and interpoles between said stator and said rotor for modulating the first magnetic field;

wherein magnetic poles are generated within the rotor by the modulated first magnetic field, the generated poles forming a second magnetic field; and wherein the rotor is formed of sufficiently magnetically hard material that when an external mechanical drive is used to induce rotational motion of the rotor, the second magnetic field also rotates, thus generating a voltage across the windings of the stator, the voltage frequency being dependent on the number and/or the spacing of said interpoles.

Typically, the magnitude of the voltage generated by the hysteresis generator is also dependent on the number and/or the spacing of said interpoles.

Thus, the third aspect of the invention provides a hysteresis generator having an in-built gearing mechanism. This gearing mechanism is provided by the interpoles of the generator and allows electrical power to be provided at commercially useful frequencies (e.g. 50 Hz, 60 Hz, or 400 Hz) from a rotor moving at a high rotational velocity. The mechanical drive for the rotor may be provided e.g. by a high-speed aircraft engine. In this case, the rotor preferably contains cobalt, which has a high Curie temperature and so retains magnetisation at the high operating temperatures typically experienced in this application.

Both the hysteresis motor of the second aspect of the invention and the hysteresis generator of the third aspect of the invention may be configured such that the rotor has slots to disrupt the formation of certain magnetic pole distributions. Preferably the slots extend radially inwards from the outer surface of the rotor.

The magnetically hard material of the rotor is characterised by high levels of hysteresis and a high coercivity. In general, the coercivity is at least 10 000 Amperes per meter. Typically, the magnetically hard material is chrome steel or cobalt steel.

Embodiments of the invention will now be described by way of example with reference to the accompanying drawings in which:

FIG. 3 shows a schematic plan view a gearbox of a second embodiment of the invention.

FIG. 4(a) shows a schematic section view of a gearbox of a third embodiment of the invention.

FIG. 4(b) shows schematic front views of the gear rotors of the embodiment shown in FIG. 4(a).

Figure 1:
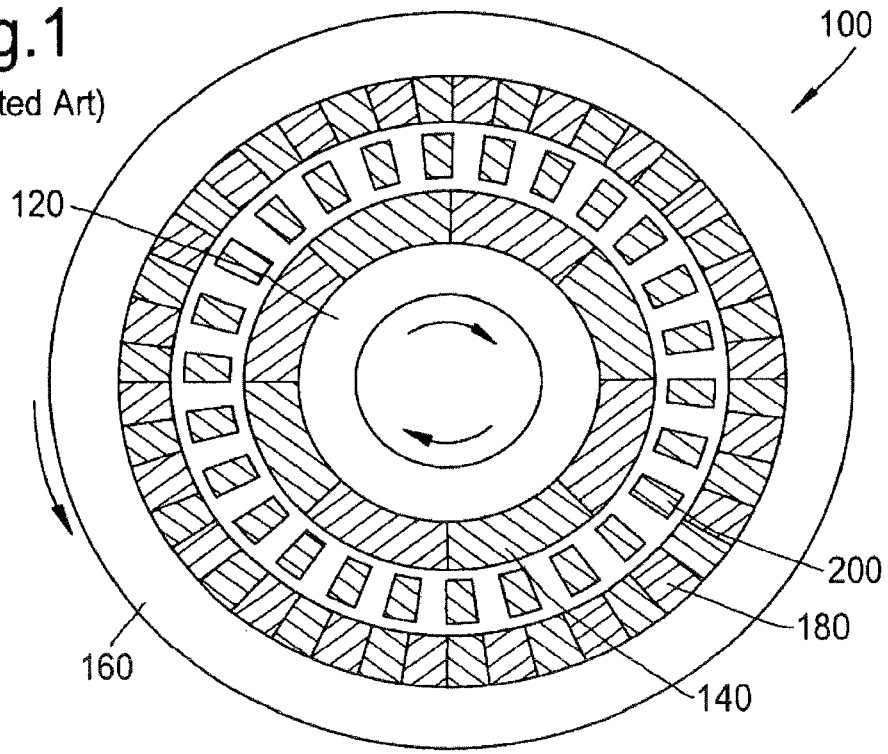
FIG. 1 shows a schematic plan view of a gearbox of the prior art.
Figure 2:
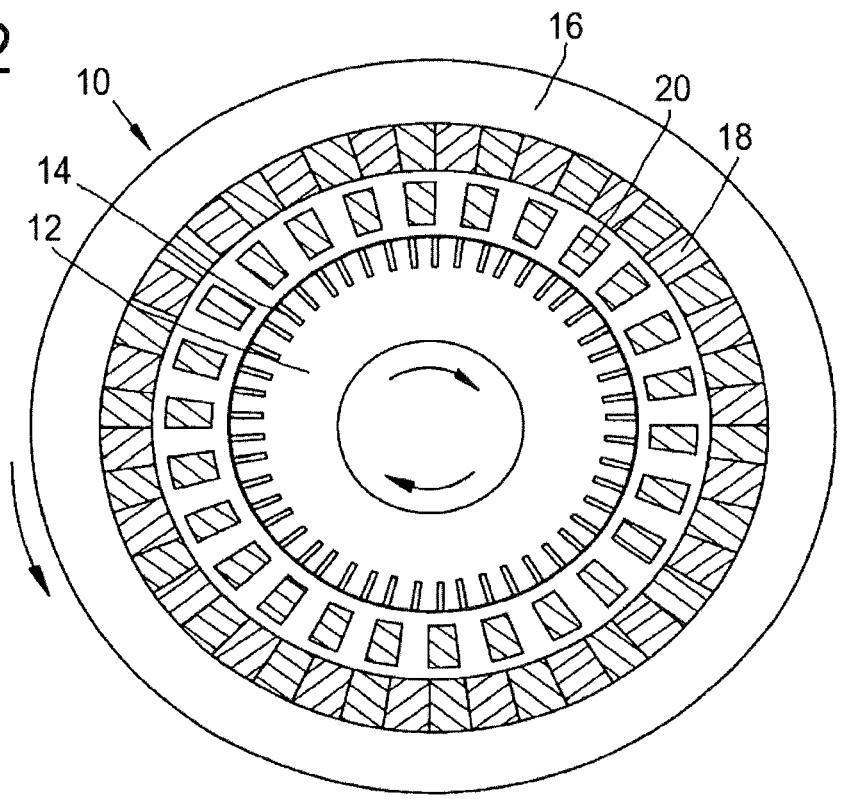
FIG. 2 shows a schematic plan view of a gearbox of a first embodiment of the invention.

FIG. 2 shows a schematic plan view of a magnetic gear arrangement of the present invention. The magnetic gear arrangement 10 is an epicyclic gearbox and comprises a magnetically passive inner rotor 12 and a magnetically active outer rotor 16. Between the two rotors lies a set of interpoles 20, arranged to form a cylindrical array.

A plurality of permanent magnets 18 are affixed to the outer rotor 16, and have alternating polarity along the circumference of the rotor. As an alternative to magnets, the outer rotor may have electrical windings associated with it for generating a magnetic field.

The interpoles 20 are for modulating the magnetic field generated by the permanent magnets 18, and are made from a magnetically soft material e.g. electrical steel. The interpoles are typically laminated, so as to minimise losses caused by eddy currents.

The inner rotor 12 comprises a cylinder of magnetically hard material e.g. chrome steel or cobalt steel. This material typically has a coercivity of at least 10,000 Amperes per meter During operation of the gearbox, magnetic poles are formed on this cylinder by the magnetic field generated by the permanent magnets 18 on the outer rotor 16, the magnetic field being modulated by the interpole members 20.

Since the cylinder of the inner rotor 12 is made of magnetically hard material, it exhibits a significant level of hysteresis. Thus, the magnetic poles formed on the cylinder have some stability and are slow to change in response to the movement of the outer rotor 16. As a result, the inner rotor 12 will tend to rotate in response to rotation of the outer rotor 16.

At the same time, however, it is possible to induce different numbers of magnetic poles on the cylinder of the inner rotor 12, depending on the number of permanent magnets 18 on the outer rotor 16, and on the number of interpoles 20. Thus, the configuration of the inner rotor 12 allows a gearbox to be provided in which the gear ratio may be varied.

Typically, in this magnetic gear arrangement, the number of magnetic poles generated on the cylinder of the inner rotor 12 is determined by one of two possible configurations. The first configuration has a number of magnetic poles corresponding to the sum of the number of permanent magnets affixed to the outer rotor 16 and the number of interpoles 20, and therefore has a high number of magnetic poles. The second configuration has a number of magnetic poles corresponding to the difference between the number of permanent magnets affixed to the outer rotor 16 and the number of interpole members 20, and therefore has a low number of magnetic poles, i.e. a lower number of magnetic poles than the first configuration.

It is desirable that the inner rotor 12 should have a higher rotational speed than the outer rotor 16, since the inner rotor 12 is better able to withstand the mechanical stresses induced by rotational motion. This is because the magnetic material of the inner rotor 12 is in the form of a cylinder, whereas the outer rotor 16 has separately-formed permanent magnets affixed to it, which may become detached at high rotational speeds.

Thus, it is desirable that a low number of magnetic poles should be formed on the cylinder of the inner rotor 12 i.e. a number of poles corresponding to the second configuration of magnetic poles.

In order to achieve this, the cylinder of the inner rotor 12 has disrupting slots 14, which extend radially inwards from the outer surface of the cylinder. These slots tend to disrupt the formation of magnetic pole distributions having a high number of magnetic poles, if the spacing of the slots does not match the spacing of the poles. The formation of pole distributions having a low number of poles is disrupted to a much lesser extent. This is considered to be due to the fact that higher polarity magnetic fields will tend to be confined to the radially outer regions of the cylinder of the inner rotor 12, while lower polarity magnetic fields tend to permeate the radially inner regions of the cylinder.

The slots 14 may be filled with a non-magnetic material. This is thought to reduce windage losses. Alternatively, the disrupting slots may contain an electrical winding for producing various electromagnetic effects such as improved starting, and damping of unwanted oscillations. The electrical winding may form part of a cage winding, such as that used in a squirrel cage induction motor.

The gear arrangement of FIG. 2 may be converted to a motor. In this case, the magnetically passive gear member (equivalent to the inner rotor 12) is configured to rotate, while the magnetically active gear member (equivalent to the outer rotor 16) is converted to a stator.

The stator is provided with electrical windings, rather than permanent magnets, and these windings may allow the magnetic gear arrangement to behave as a motor. For example, if the windings are wound in ways similar to known electrical machines and electrical power is supplied to the windings, the magnetic gear arrangement will behave as a hysteresis motor with the inner rotor 12 producing a mechanical power output.

An advantage of a hysteresis motor configured in this way is that low frequency electric current may be used to generate high motor speeds. The interpoles 20 effectively provide an in-built gearing mechanism for producing high motor speeds from low frequency electric current. FIG. 3 shows a schematic plan view of an alternative configuration of the magnetic gear arrangement of the present invention. The gear arrangement 30 is an epicyclic gearbox and has a magnetically active inner rotor 32, to which a plurality of permanent magnets 34 is affixed. The magnetically passive outer rotor 36 comprises a cylinder of magnetically hard material on which a plurality of magnetic poles are formed in response to the magnetic field generated by the permanent magnets 34 of the inner rotor 32.

The magnetic field generated by the permanent magnets 34 of the inner rotor 32 is modulated by interpoles 40 located between the inner and outer rotors 32,36.

Slots 38 in the outer rotor 36 tend to restrict the formation of magnetic pole distributions having a high number of poles. To reduce windage losses, the slots 38 may be filled with a non-magnetic material. The slots 38 may also carry an electrical winding such as a cage winding as used in a squirrel cage induction motor, or an amortisseur winding as used in an electrical synchronous machine. The slots 38 may also contain electrical insulation so that the electrical winding is insulated from the body of the inner rotor.

In this magnetic gear arrangement, the outer rotor 36 is configured to rotate at a higher speed than the inner rotor 32.

FIG. 4 shows a magnetic gear arrangement of another embodiment of the present invention. FIG. 4(a) shows a side view of the gear arrangement, while FIG. 4(b) shows two views taken from the front and rear of the gear arrangement. The gear arrangement 50 is a co-axial gearbox having a magnetically active first rotor 52 to which a plurality of permanent magnets 54 is affixed. The magnetically passive second rotor 56 comprises a cylinder of magnetically hard material on which a plurality of magnetic poles are formed in response to the magnetic field generated by the permanent magnets 54 of the first rotor 52. The central axes of the first and second rotors 52,56 coincide.

The magnetic field generated by the permanent magnets 54 of the first rotor 52 is modulated by interpoles 60 that are arranged to form a cylindrical array. The first and second rotors 52,56 are located within this cylindrical array, each at a respective end of the array. Alternatively, the first and second rotors 52,56 may lie outside the cylindrical array of interpoles 60, each rotor being located at a respective end of the array.

Slots 58 in the second rotor 56 tend to restrict the formation of magnetic pole arrangements having a high number of poles.

In this magnetic gear arrangement, the second rotor 56 is configured to rotate at a higher speed than the first rotor 52.

In an alternative configuration of this embodiment, the central axes of the first and second rotors may be displaced, rather than coincident. In this case, the array of interpoles will have the specific shape required to extend between the first and second rotors. Such an arrangement of interpoles is described, for example, in WO2007/135360.

Figure 5:
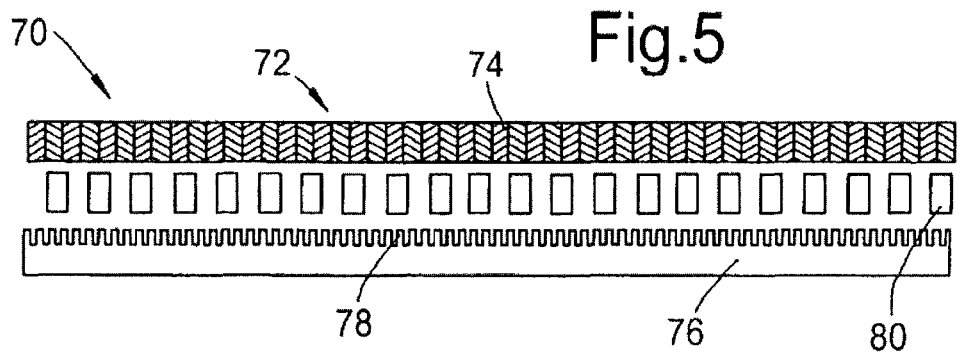
FIG. 5 shows a schematic plan view of a linear actuator according to the present invention.

FIG. 5 shows a schematic plan view of a linear actuator according to the present invention. The actuator 70 comprises an elongate magnetically active first member 72 to which a plurality of permanent magnets 74 are affixed. The magnetically passive second member 76 comprises an elongate portion of magnetically hard material that is aligned with the first elongate member 72 and on which a plurality of magnetic poles are formed in response to the magnetic field generated by the permanent magnets 74 of the first member 72.

The magnetic field generated by the permanent magnets 74 of the first member 72 is modulated by interpoles 80 located between the first and second members 72,76.

Slots 78 provided along the length of the second member 76 tend to restrict the formation of magnetic pole distributions having a high number of poles. Thus the formation of pole distributions having a low number of poles is promoted.

In this actuator, the first member 72 is configured as a low-speed member and the second member 76 is configured as a high-speed member.

Figure 6:
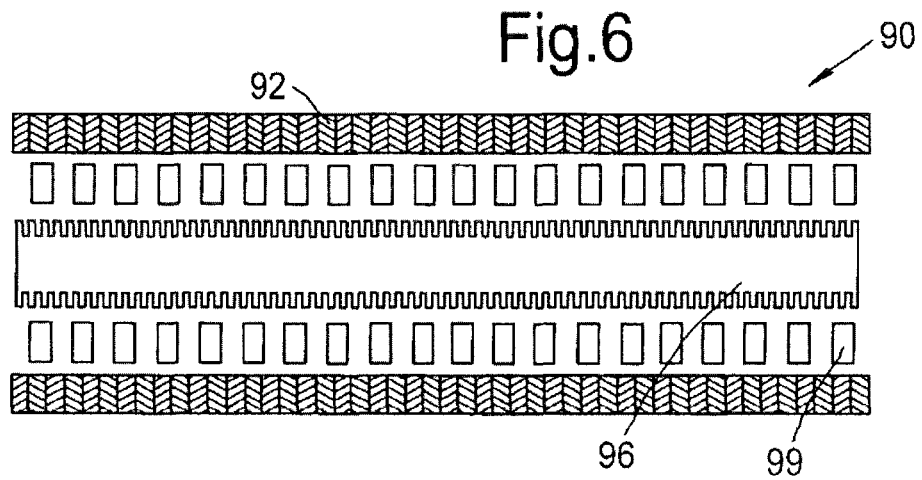
FIG. 6 shows a schematic plan view of another linear actuator according to the present invention.

FIG. 6 shows a schematic plan view of another linear actuator according to the present invention. The actuator 90 is a double-sided version of the linear actuator shown in FIG. 5, the first member 92, the interpole members 99 and the second member 96 being arranged so that the actuator is symmetrical about the second member 96.

Figure 7:
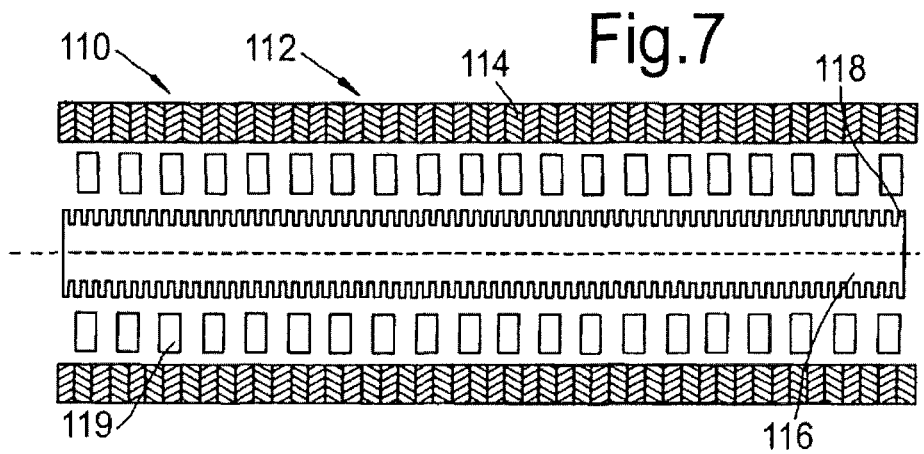
FIG. 7 shows a schematic section view of a tubular actuator according to the present invention.

FIG. 7 shows a schematic plan view of a tubular actuator according to the present invention. The actuator 110 has a magnetically active tubular first member 112 to which permanent magnets 114 are affixed. The magnetically passive second member 116 comprises an elongate portion of magnetically hard material that is aligned with the central axis of the tubular first member 112 and on which a plurality of magnetic poles are formed in response to the magnetic field generated by the permanent magnets 114 of the first member 112.

The magnetic field generated by the permanent magnets 114 of the first member 112 is modulated by interpoles 119 located between the first and second members 112,116.

Slots 118 are provided along the length of the second member 116, each slot extending around the second member 116 in a circumferential direction. These slots 118 promote the formation of magnetic pole distributions having a low number of poles.

In the tubular actuator, the first member 112 is configured as a low-speed member and the second member 116 is configured as a high-speed member.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A magnetic gear arrangement comprising:
    a magnetically active gear member for generating a first magnetic field,
    a magnetically passive gear member, and
    a number of interpoles between said magnetically active gear member and said magnetically passive gear member for modulating the first magnetic field, wherein:
        a number of magnetic poles are generated within the magnetically passive gear member by the modulated first magnetic field, the generated poles forming a second magnetic field,
        the magnetically passive gear member is formed of sufficiently magnetically hard material that the first magnetic field couples to the second magnetic field to produce a gear ratio between the magnetically active and the magnetically passive gear members, and
        a magnetically active gear member has a plurality of poles, the number of generated magnetic poles is equal to a sum of the number of poles on the magnetically active gear member and the number of interpoles.

2. A magnetic gear arrangement according to claim 1, wherein the magnetically hard material has a coercivity of at least 10,000 Amperes per meter.

3. A magnetic gear arrangement according to claim 1, wherein said magnetically passive gear member has slots which disrupt the generation of selected distributions of magnetic poles.

4. A magnetic gear arrangement as claimed in claim 3 wherein a non-magnetic material is provided in the slots.

5. A magnetic gear arrangement as claimed in claim 3 wherein the slots contain an electrical winding.

6. A magnetic gear arrangement according to claim 1, wherein said magnetically active and magnetically passive gear members are rotors.

7. A magnetic gear arrangement according to claim 6, wherein said magnetically passive gear member is configured to act as a high speed rotor relative to said magnetically active gear member.

8. A magnetic gear arrangement as claimed in claim 1 wherein said magnetically active gear member comprises permanent magnets.

9. A magnetic gear arrangement as claimed in claim 1 wherein said magnetically active and magnetically passive gear members are elongate to form a linear actuator.

10. A magnetic gear arrangement as claimed in claim 9 wherein said magnetically active gear member is tubular and said magnetically passive gear member is arrangement within the magnetically active gear member.

11. A magnetic gear arrangement as claimed in claim 1 wherein said magnetically active gear member comprises permanent magnets.

12. A magnetic gear arrangement as claimed in claim 8 wherein said magnetically active gear member comprises electrical windings through which an electrical current may be passed to generate the first magnetic field.

13. A magnetic gear arrangement as claimed in claim 12 wherein the magnetic gear arrangement forms a hysteresis motor or a hysteresis generator.

14. A hysteresis motor comprising:
    a magnetically active gear member comprising a stator having windings through which an electrical current may be passed to generate a first magnetic field;
    a rotor; and a number of interpoles between said stator and said rotor for modulating the first magnetic field, wherein:
- a number of magnetic poles are generated within the rotor by the modulated first magnetic field, the generated poles forming a second magnetic field,
- the rotor is formed of sufficiently magnetically hard material that the first magnetic field couples to the second magnetic field to induce rotational motion of the rotor at a rotational speed that is dependent on the number and/or the spacing of said interpoles, and
- the magnetically active gear member has a plurality of poles, a number of generated magnetic poles is equal to a sum of the number of poles on the magnetically active gear member and the number of interpoles.

15. A hysteresis generator comprising:
a magnetically active gear member comprising a stator having windings through which an electrical current may be passed to generate a first magnetic field;
a rotor; and
a number of interpoles between said stator and said rotor for modulating the first magnetic field, wherein:
- a number of magnetic poles are generated within the rotor by the modulated first magnetic field, the generated poles forming a second magnetic field,
- the magnetically active gear member has a plurality of poles, the rotor is formed of sufficiently magnetically hard material that when an external mechanical drive is used to induce rotational motion of the rotor, the second magnetic field also rotates, thus generating a voltage across the windings of the stator, the voltage frequency being dependent on the number and/or the spacing of said interpoles, and
- the number of generated magnetic poles is equal to a sum of the number of poles on the magnetically active gear member and the number of interpoles.

* * * * *